United States Patent
Sutaria et al.

(10) Patent No.: US 11,321,750 B1
(45) Date of Patent: **\*May 3, 2022**

(54) MULTIPLE DATA STORE AUTHENTICATION

(71) Applicant: Seven Networks, LLC, Marshall, TX (US)

(72) Inventors: Jay Sutaria, Mountain View, CA (US); Brian Daniel Gustafson, Montara, CA (US); Robert Paul van Gent, Redwood City, CA (US); Ruth Lin, Santa Clara, CA (US); David Merriwether, Menlo Park, CA (US); Parvinder Sawhney, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,589

(22) Filed: Nov. 30, 2021

Related U.S. Application Data

(63) Continuation of application No. 17/471,301, filed on Sep. 10, 2021, which is a continuation of application
(Continued)

(51) Int. Cl.
*H04L 29/06* (2006.01)
*G06Q 30/06* (2012.01)
(Continued)

(52) U.S. Cl.
CPC ............. *G06Q 30/06* (2013.01); *G06F 21/44* (2013.01); *H04L 63/083* (2013.01);
(Continued)

(58) Field of Classification Search
CPC .. H04L 63/102; H04L 63/0876; H04W 12/08; H04W 12/06
See application file for complete search history.

(56) References Cited

U.S. PATENT DOCUMENTS 6,336,138 B1 \* 1/2002 Caswell .................. H04L 41/12
709/224
7,139,565 B2 \* 11/2006 Fiatal .................. H04L 63/0464
455/425

(Continued)

OTHER PUBLICATIONS

Decker et al. "Proximity as a security property in a mobile enterprise application context", 37th Annual Hawaii International Conference on System Sciences, 2004. Proceedings of the, Date of Conference: Jan. 5-8, 2004.\*

*Primary Examiner* — Morshed Mehedi
(74) *Attorney, Agent, or Firm* — NK Patent Law

(57) ABSTRACT

Systems and methods for authenticating access to multiple data stores substantially in real-time are disclosed. The system may include a server coupled to a network, a client device in communication with the server via the network and a plurality of data stores. The server may authenticate access to the data stores and forward information from those stores to the client device. An exemplary authentication method may include receipt of a request for access to data. Information concerning access to that data is stored and associated with an identifier assigned to a client device. If the identifier is found to correspond to the stored information during a future request for access to the store, access to that store is granted.

38 Claims, 6 Drawing Sheets

Related U.S. Application Data

No. 17/373,832, filed on Jul. 13, 2021, which is a continuation of application No. 17/198,984, filed on Mar. 11, 2021, now Pat. No. 11,070,561, which is a continuation of application No. 17/119,448, filed on Dec. 11, 2020, now Pat. No. 10,979,435, which is a continuation of application No. 17/090,086, filed on Nov. 5, 2020, now abandoned, which is a continuation of application No. 17/025,078, filed on Sep. 18, 2020, now Pat. No. 11,212,290, which is a continuation of application No. 16/902,334, filed on Jun. 16, 2020, now Pat. No. 10,805,307, which is a continuation of application No. 16/448,708, filed on Jun. 21, 2019, now Pat. No. 10,902,487, which is a continuation of application No. 16/263,035, filed on Jan. 31, 2019, now Pat. No. 10,348,736, which is a continuation of application No. 16/173,382, filed on Oct. 29, 2018, now Pat. No. 10,560,459, which is a continuation of application No. 15/899,947, filed on Feb. 20, 2018, now Pat. No. 10,243,962, which is a continuation of application No. 15/362,236, filed on Nov. 28, 2016, now Pat. No. 9,912,671, which is a continuation of application No. 15/155,061, filed on May 15, 2016, now Pat. No. 9,578,027, which is a continuation of application No. 14/487,093, filed on Sep. 16, 2014, now Pat. No. 9,342,684, which is a continuation of application No. 13/614,583, filed on Sep. 13, 2012, now Pat. No. 8,839,412, which is a continuation of application No. 11/640,629, filed on Dec. 18, 2006, now Pat. No. 8,438,633, which is a continuation-in-part of application No. 11/525,294, filed on Sep. 21, 2006, now Pat. No. 8,064,583, which is a continuation of application No. 11/112,690, filed on Apr. 21, 2005, now Pat. No. 7,796,742.

(51) Int. Cl.
  *H04W 12/069* (2021.01)
  *G06F 21/44* (2013.01)
  *H04W 12/06* (2021.01)
  *H04W 12/08* (2021.01)

(52) U.S. Cl.
  CPC .......... *H04L 63/0876* (2013.01); *H04L 63/10* (2013.01); *H04L 63/102* (2013.01); *H04W 12/06* (2013.01); *H04W 12/069* (2021.01); *H04W 12/08* (2013.01)

(56) References Cited

U.S. PATENT DOCUMENTS

| | | | | |
|---|---|---|---|---|
| 8,438,633 | B1* | 5/2013 | Backholm | G06Q 30/06 726/17 |
| 2001/0034225 | A1* | 10/2001 | Gupte | H04L 51/24 455/412.2 |
| 2002/0035681 | A1 | 3/2002 | Maturana et al. | |
| 2002/0161769 | A1* | 10/2002 | Sutinen | G06F 16/275 |
| 2003/0149781 | A1* | 8/2003 | Yared | H04L 63/0807 709/228 |
| 2003/0177267 | A1 | 9/2003 | Orava et al. | |
| 2004/0073786 | A1 | 4/2004 | ONeill et al. | |
| 2005/0188098 | A1 | 8/2005 | Dunk | |
| 2005/0198170 | A1* | 9/2005 | LeMay | H04L 63/045 709/206 |
| 2006/0069687 | A1* | 3/2006 | Cui | H04L 67/08 |
| 2007/0220099 | A1* | 9/2007 | Di Giorgio | H04L 69/08 709/206 |

\* cited by examiner

MULTIPLE DATA STORE AUTHENTICATION

CROSS-REFERENCE TO RELATED APPLICATIONS

This application is a continuation of U.S. patent application Ser. No. 17/471,301 filed Sep. 10, 2021, which is a continuation of U.S. patent application Ser. No. 17/373,832 filed Jul. 13, 2021, which is a continuation of U.S. patent application Ser. No. 17/198,984 filed Mar. 11, 2021, now U.S. Pat. No. 11,070,561 issued Jul. 20, 2021, which is a continuation of U.S. patent application Ser. No. 17/119,448 filed Dec. 11, 2020, now U.S. Pat. No. 10,979,435 issued Apr. 13, 2021, which is a continuation of U.S. patent application Ser. No. 17/090,086 filed Nov. 5, 2020, which is a continuation of U.S. patent application Ser. No. 17/025,078 filed Sep. 18, 2020, which is a continuation of U.S. patent application Ser. No. 16/902,334 filed Jun. 16, 2020, now U.S. Pat. No. 10,805,307 issued Oct. 13, 2020, which is a continuation of U.S. patent application Ser. No. 16/448,708 filed Jun. 21, 2019, now U.S. Pat. No. 10,902,487 issued on Jan. 26, 2021, which is a continuation of U.S. patent application Ser. No. 16/263,035 filed Jan. 31, 2019, now U.S. Pat. No. 10,348,736 issued Jul. 9, 2019, which is a continuation of U.S. patent application Ser. No. 16/173,382 filed Oct. 29, 2018, now U.S. Pat. No. 10,560,459 issued on Feb. 11, 2020, which is a continuation of U.S. patent application Ser. No. 15/899,947 filed Feb. 20, 2018, now U.S. Pat. No. 10,243,962 issued Mar. 26, 2019, which is a continuation of U.S. patent application Ser. No. 15/362,236 filed Nov. 28, 2016, now U.S. Pat. No. 9,912,671 issued Mar. 6, 2018, which is a continuation of U.S. patent application Ser. No. 15/155,061 filed May 15, 2016, now U.S. Pat. No. 9,578,027 issued Feb. 21, 2017, which is a continuation of U.S. patent application Ser. No. 14/487,093 filed Sep. 16, 2014, now U.S. Pat. No. 9,342,684 issued May 17, 2016, which is a continuation of U.S. patent application Ser. No. 13/614,583 filed Sep. 13, 2012, now U.S. Pat. No. 8,839,412 issued Sep. 16, 2014, which is a continuation of U.S. patent application Ser. No. 11/640,629 filed Dec. 18, 2006, now U.S. Pat. No. 8,438,633 issued May 7, 2013, which is a continuation-in-part of U.S. patent application Ser. No. 11/525,294 filed Sep. 21, 2006, now U.S. Pat. No. 8,064,583 issued Nov. 22, 2011, which is a continuation of U.S. patent application Ser. No. 11/112,690 filed Apr. 21, 2005, now U.S. Pat. No. 7,796,742 issued Sep. 14, 2010. The disclosure of each of these applications is incorporated herein by reference in their entirety.

BACKGROUND OF THE INVENTION

1. Field of the Invention

The present invention relates to authentication and access to data in data stores substantially in real-time, and to service activation, including simplified provisioning and multiple data store authentication.

2. Description of Related Art

Conventionally, a user purchasing services associated with a device needs to register with a service provider to provide specific information about the user. The service provider often has a customer service center that assists the user with registration for various services associated with the wireless device. For instance, the customer service center can record personal information about the user in order to provide wireless Internet services. The service provider typically requires billing information from the user in order to identify the user and collect monies from the user for the services being provided.

When the user activates various services, the service provider may program various databases with the user's personal information, as well as information associated with the device the user is using to access the services. This process may be referred to as "provisioning." Often, the user spends time on the phone with a representative of the service provider in order to provide the information the service provider requires in order to program the various databases. Alternatively, the user may spend time on a device associated with the user in order to provide the requisite information for the provisioning. In exchange for providing the information to the service provider, the user obtains access to certain resources made available by the service provider.

Other common-place factors in the mobile device world make repeated authentication experiences even more inconvenient. The need to access more than one account (e.g., personal and work e-mail), limited time to access an account (e.g., only a few minutes before a lengthy meeting), and the need to have access to new data in near real-time further evidence the difficulties encountered with repeated authentication. Notwithstanding, few users or enterprises are willing to surrender data security (i.e., no user or device authentication wherein anyone could conceivably access the account or data store given knowledge of the existence of that account or data store) for the sake of convenience. As such, there is a need in the art for authenticating access to multiple data stores while maintaining certain security precautions offered by user or device authentication.

Collecting the user's personal information and storing the information in the databases is frequently done in order to maintain security and ensure that each user pays for the resources being requested. However, users often resent the time it takes to register for access to the resources. Further, users may register many times with the same service provider for different resources available via the service provider. Numerous minutes or hours spent entering information required by the service provider may deter users from subscribing to the various resources offered by the service provider. There is, therefore, a need for a system and method for simplified provisioning.

SUMMARY OF THE INVENTION

An exemplary embodiment of the present invention provides a system for authenticating access to multiple data stores. The exemplary embodiment may include a server, which is coupled to a network. A client device may communicate with the server via the network. Various client devices may be used in this embodiment including cellular telephones, personal digital assistants, or a personal computer. The server may be configured to authenticate access to a plurality of data stores coupled to the server. The data stores may each include a connection management application configured to inform the server of the presence of new data or a change to existing data at the one or more data stores. The server may be configured to authenticate access to the one or more data stores and forward the new data or changed existing data from the one or more data stores to the mobile or client device. This forwarding of data may occur substantially in real-time. In one example, the data stores may be associated with an electronic mail server provider.

A further embodiment of the system may also include a short message service (SMS) center. The SMS center may be configured to transmit an SMS message to the mobile device at the instruction of the server upon the server having been informed of the presence of new data or a change to existing data at the one or more data stores. The SMS message transmitted to the mobile device may cause the mobile device to initiate a synchronization operation whereby the server authenticates access to the one or more data stores and forwards the new data or changed existing data from the one or more data stores to the mobile device.

Yet another embodiment of the system includes an Internet Protocol (IP) connection manager configured to manage an IP connection between the server and the mobile device. The IP connection may be used for and/or to initiate a synchronization operation whereby the server authenticates access to the one or more data stores and forwards the new data or the changed existing data from the one or more data stores to the mobile device.

In some instances, an SMS center may transmit an SMS message to the mobile device at the instruction of the server upon the server being informed of the presence of new data or a change to existing data at the one or more data stores prior to the IP connection manager opening an IP connection between the server and the mobile device. The SMS message transmitted to the mobile device may cause the mobile device to accept the IP connection being established by the IP connection manager and between the server and the mobile device, whereby the synchronization operation occurs asynchronously and in the background of other mobile device operations. By utilizing an SMS message to 'wake up' the mobile device and accept the IP connection, it may not be necessary to maintain an ongoing IP connection, which may drain battery resources or incur network bandwidth charges in some mobile devices.

In some embodiments of the aforementioned system, the server may only authenticate access to specific data stores of the one or more data stores. The specific data stores may be the one or more data stores having new data or changed existing data as indicated by the connection management application. Alternatively, the specific data stores may be those manually identified by a user of the mobile device for a particular synchronization operation. In yet another implementation, the server may only authenticate access to those data stores identified by a synchronization profile for all synchronization operations, the synchronization profile having been created by a user of the mobile device.

Authentication to the plurality of data stores may occur by utilizing data provided to the server by the client device. Authentication may also occur by comparing the data provided to the server by the client device with information at the plurality of data stores, which may have been provided by the client device during a previous authentication encounter.

In some embodiments, the server may be further configured to authenticate the client device prior to the server authenticating access to the plurality of data stores. Authentication of the client device may, for example, include the user of information identifying the client device or a token, which comprises a unique string of data. Alternatively, the server may be further configured to authenticate a user of the client prior to the server authenticating access to the plurality of data stores. Authentication may include use of a user name or a user name in further combination with a password.

In another exemplary embodiment of the present invention, a computing device for authenticating access to multiple data stores is provided. The computing device may include a communications interface for exchanging information over a network; an identification module for identifying a client device or user thereof based on information provided by the client device, the information may be provided by the client device without intervention; and a registration module for accessing multiple data stores and authenticating access to the multiple data stores by the client device or user thereof. The communications interface may also receive information from the multiple data stores following authentication and may further forward received information to the client device. The communications interface may allow for the device to communicate with an SMS center or an IP connection manager in order to inform a mobile device of the presence of new data or a change to existing data at one or more of the multiple data stores and the need to initiate a synchronization operation.

In some embodiments, a method for authenticating access to multiple data stores is provided, wherein an indication of the existence of new data or a change to existing data at one or more of the multiple data stores is received. A mobile device is then informed of the existence of new data or a change to existing data at one or more of the multiple data stores. A request from the mobile device for access to at least one of the one or more multiple data stores is received and the mobile device is queried. The query to the mobile device is for (at least) an identifier associated with stored information for accessing the one or more of the multiple data stores. The one or more of the multiple data stores are then accessed if the identifier received from the mobile device corresponds to the information associated with accessing the one or more of the multiple data stores.

In a further embodiment, information at the one or more of the multiple data stores is forwarded to the mobile device. Forwarding of this information may occur substantially in real-time. The forwarded information may be electronic mail. Data at the one or more of the multiple data stores may have been previously filtered and an indication of the existence of new data or changed existing data at the data store may be sent only when the filtered data corresponds to a particular configuration of the filter (e.g., desired data warranting the generation of an indication of new or changed existing data).

The mobile device may been informed of the existence of new data or a change to existing data at the one or more of the multiple data stores may occur through the issuance of an SMS message trigger. The mobile device may also be informed through the issuance of an IP trigger followed by establishment of an IP connection. The IP connection may, in some embodiments, occur following the issuance of an SMS trigger. Upon the mobile device being informed of the existence of the data via one of the aforementioned triggers (e.g., SMS. IP, or a combination of SMS and IP), a synchronization operation may commence.

The identification module of the computing device may identify the client device based on a client identifier. The client identifier may include a unique string of data (a token), which may have been previously assigned to the client device by the identification module. The client identifier, in another embodiment, may include a telephone number or, alternatively, a user name associated with a user of the device.

The identification module, in some embodiments of the present invention, may compare the aforementioned client identifier with information at one or more of the multiple data stores. The information at the multiple data stores may include information provided by the client device during a previous authentication operation. The registration module may also query the user of the client device for information required for accessing the multiple data stores if that information is not currently present.

An exemplary embodiment of the present invention provides a method for authenticating access to multiple data stores. In the exemplary method, a request is received from a client device to access a data store. Information associated with accessing the data store is stored and an identifier is assigned to the client device, that identifier being associated with the stored information. When a subsequent request for access to the data store is received, a query is made with respect to the identifier and if the identifier corresponds to the stored information for accessing the aforementioned data store, the data store is accessed.

In another embodiment of the aforementioned method, a client device may request access to a second data store. Information associated with accessing the second data store may be stored and further associated with the identifier initially associated with information concerning the access of the first data store. Upon receipt of a subsequent request for access to the second data store, if the assigned identifier corresponds to the information associated with accessing the second data store, access is granted to that data store. The information accessed at the first and second data store may be forwarded to the client device. That information may be electronic mail.

In yet another exemplary method for authenticating access to multiple data stores, a client device request for access to a data store is received. The client device may then be queried for an identifier associated with stored information for accessing the data store. If the assigned identifier corresponds to the information associated with accessing the data store, then the store may be accessed. The method may further include the steps of accessing a further data store if the assigned identifier corresponds to information associated with accessing the further data store. The information at the data stores may then be forwarded to the client device. The information may be electronic-mail.

An embodiment of the present invention provides for a computer-readable medium having embodied thereon a program executable by a processor to perform a method for authenticating access to multiple data stores. The method may include receiving a client device request for access to a data store; storing information associated with accessing the data store; assigning an identifier to the client device, wherein the identifier is associated with the stored information for accessing the data store; receiving a subsequent request for access to the data store; querying the client device for the assigned identifier; and accessing the data store if the assigned identifier corresponds to the information associated with accessing the data store.

The computer-readable medium may further include a program executable to receive a client device request for access to a second data store; store information associated with accessing the second data store; associate the stored information for accessing the second data store with the previously assigned identifier; receive a subsequent request for access to the second data store; and access the second data store if the assigned identifier corresponds to the information associated with accessing the second data store.

In yet another embodiment of the present invention, a computer-readable medium is provided for authenticating access to multiple data stores. The method may include receiving a client device request for access to a data store; querying the client device for an identifier associated with stored information for accessing the data store; accessing the data store if the assigned identifier corresponds to the information associated with accessing the data store; and accessing a second data store if the assigned identifier corresponds to information associated with accessing the second data store. The computer-readable medium may further include program instructions for forwarding information at the data stores to the client device, wherein the forwarded information is electronic mail.

DETAILED DESCRIPTION

Figure 1:
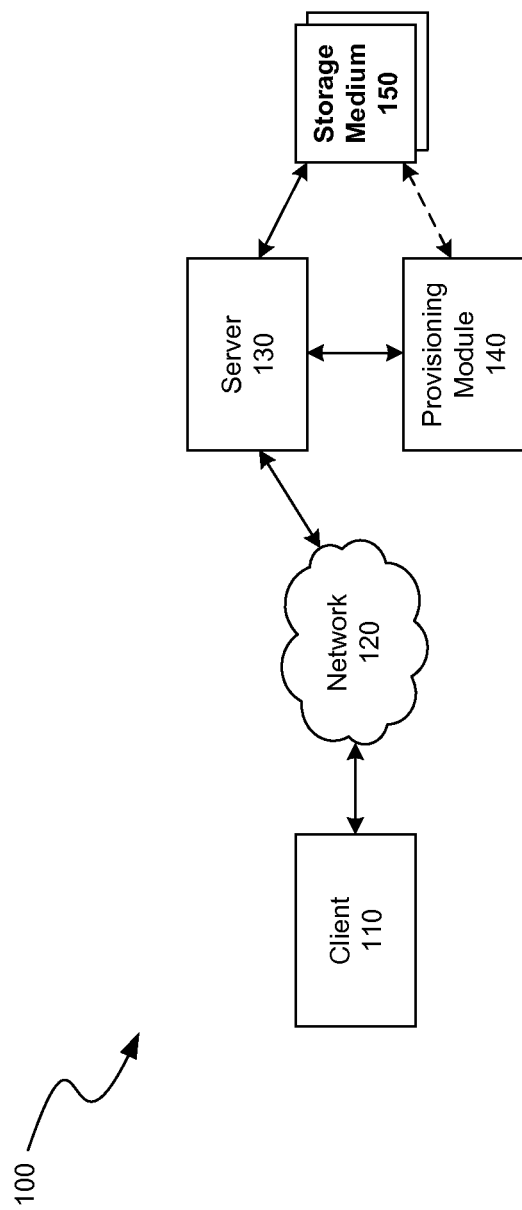
FIG. 1 illustrates an exemplary environment for providing simplified provisioning in accordance with one embodiment of the present invention.

FIG. 1 illustrates an exemplary environment 100 for providing simplified provisioning, including authentication of data store access, in accordance with one embodiment of the present invention. A client 110 communicates with a server 130 via a network 120. The client 110 may include any type of device, such as a cellular telephone, a personal digital assistant (PDA), a personal computer, etc. In some instances, client 110 may be a data-enabled device that can, for example, send and receive electronic-mail, receive and send short message service (SMS) messages, access the Internet and so forth.

Any type of provisioning, which may include various forms of authentication, may be provided according to various embodiments of the present invention. For instance, the provisioning may include an event registering a user in response to a user request for services, a communication to the user offering services, a communication to the user including activation data, a communication to the user with a uniform resource locator (URL) where the user can obtain additional information regarding services, and so on (generally referred to as a "provisioning event"). Any type of provisioning event is within the scope of various embodiments of the present invention.

Similarly, any type of services provided by a service provider managing the provisioning events is possible. For instance, the service provider may provide internet services, application services, wireless services, and so on. A common example of such a service includes electronic-mail access, which may be provided through an Internet electronic-mail account or through a server/data store as may be found, for example, in a commercial enterprise. The offering of electronic-mail services may also include an offering by a network provider or certain domain hosting companies that offer electronic-mail hosting as a value add to domain name hosting services.

A provisioning module 140 may be coupled to the server 130 for providing provisioning event related services, which may include various forms of authentication. In one embodiment, the provisioning module 140 is included as a component of the server 130. In some instances, the provisioning module 140 may be integrated and/or accessible to the storage medium 150, which may sometimes be interchangeably referred to as a data store 150. In another embodiment, the provisioning module 140 provides provisioning event related processing for various servers. In still another embodiment, the provisioning module 140 may provide provisioning event related processing for various storage mediums 150.

The server 130 may include or otherwise have access to one or more storage mediums 150. Any type of storage medium 150 may be employed according to various embodiments of the present invention. In FIG. 1, the server 130 is coupled to the storage medium(s) 150 for storing and accessing information included in the storage medium(s) 150. This coupling may be direct (e.g., via software/hardware integration or may be a communicative coupling that may occur over a network). Storage medium(s) 150 may include internal mail servers at an enterprise or that may be offered by any variety of service providers. Storage medium(s) 150 may also include databases for storage of contact and Personal Information Management (PIM) data as well as calendar, notes, and task data. Storage medium(s) 150 may also include data stores for documents (e.g., file servers).

In an exemplary embodiment, the client 110 contacts the server 130 via the network 120 in order to request and/or access services provided by a service provider associated with the server 130. For example, a user at the client 110 may wish to subscribe to email services available by the service provider. The server 130 requests information about the user at the client 110 or about the client 110 itself before allowing the user to access services (i.e., authenticating access to the services and/or data). This information may include user ID and/or password information as well as data identifying the client device 110 such as phone number, static Internet Protocol (IP) address, dynamically assigned IP address. Electronic Serial Number (ESN), Mobile Identification Number (MIN), and/or International Mobile Equipment Identity (IMEI) data. In order to verify that the client 110 or its proxy is genuine, the server 130 may access the storage medium(s) 150 to match data provided by the client 110 with information the server 130 stored in the storage medium(s) 150 as a result of prior encounters with the client 110. In some embodiments, such information may be stored locally at the server 130 and the server 130 (as a proxy of client 110) authenticates the client 110 and then accesses the storage mediums 150. Access of the server 130 to the storage mediums 150 may require an additional authentication process. For example, if the storage mediums 150 are not integrated with the server 130 (e.g., server 130 and storage mediums 150 are overseen by separate parties), which may be similar to the authentication of the client 110.

Information may be provided automatically by the client 110 in response to a server 130 request or may be part of a manual query response whereby the user provides certain information. Some information may be dedicated to an automated response whereas other information may always require a manual response. Some types of requested information may be subject to automatic and manual response as may be determined, for example, by a client 110 device configuration or user setting.

In some instances, a client 110 or server 130 based application may be implemented with respect to matching certain information to a particular format. In the instance of a telephone number, an automated response to a request by server 130 may include an area code, local prefix, and number (10 total digits). The necessary information may, in some embodiments, be identified as a part of the request. A user, however, may manually provide additional information not required for processing the response (e.g., a country code). The application may, in these instances, derive the necessary information or filter out unnecessary information in order to arrive at an information format appropriate for the particular operation (e.g., processing only the last ten digits of the numerical string provided by the user).

Any manner of collecting information associated with the user and/or the client/device 110 associated with the user may be employed. The server 130 may collect the information from previous encounters with the client/device 110, from other service providers associated with the user and/or the client/device 110, and/or from any sources providing information about the user and/or the client/device 110.

The server 130 utilizes the provisioning module 140 to provide specified services and configurations for those services to the user at the client 110. The provisioning module 140 may verify information associated with the client 110 in one embodiment (e.g., authentication). The provisioning module 140 may have access to the storage medium(s) 150 via the server 130 or via a direct connection to the storage medium(s) 150.

Figure 2:
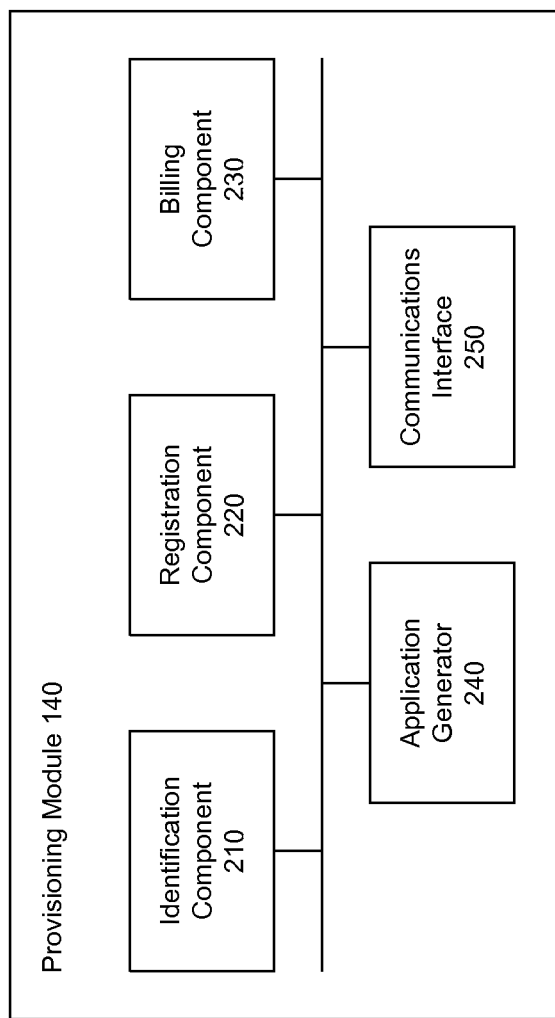
FIG. 2 illustrates a schematic diagram of an exemplary provisioning module in accordance with one embodiment of the present invention.

FIG. 2 illustrates a schematic diagram of an exemplary provisioning module 140 in accordance with one embodiment of the present invention. The provisioning module 140 may provide users with accounts, the appropriate access to those accounts, all the rights associated with those accounts (sometimes collectively referred to as authentication), all of the resources necessary to manage the accounts, and so forth. Provisioning may be utilized to refer to service activation and may also involve programming various databases, such as the storage medium(s) 150, with the user's information, as discussed herein. Although the server 130 may be identified as performing various functions, any of the functions may be performed by the provisioning module 140 and/or components thereof.

The provisioning module 140 may include an identification component 210. The identification component 210 may perform various tasks related to identifying the client 110 and/or the user associated with the client 110. The identification component 210 may assign an identifier to the client 110 and/or information associated with the user at the client 110 when the client 110 is connected to the server 130. The identification component 210 may store the information in the storage medium(s) 150 according to the identifier the identification component 210 associates with the information.

In one embodiment, the identification component 210 assigns a unique identifier, such as a number string (e.g., a token or a cookie), to the client 110 and stores the information associated with the client 110 according to the unique identifier. The identification component 210 may then forward the unique identifier to the client 110 as a communication, or part of a communication, so that the client 110 can provide the unique identifier when the client 110 connects to the server 130 on another occasion. The unique identifier may be provided as a matter of course by the client 110 in future connections with the server 130 or the server 130 may request the identifier from the client 110 as part of negotiating a connection between the two devices.

In another embodiment, a phone number associated with the client 110 is utilized by the identification component 210 to store information associated with the client 110. Accordingly, when the client 110 makes further contact with the server 130, the phone number may be used to access the information stored according to the phone number. The user may provide the phone number associated with the client 110 and/or the client 110 may provide the phone number to the server 130 when initial access to the server 130 is gained by the client 110.

The identification component 210 may also compare information provided by the user of the client 110 with information stored in the storage medium(s) 150 related to the client 110. The comparison may be performed in order to verify that the user of the client 110 is the same user of the client 110 about which the server 130 captured information during a previous encounter. The comparison may also be performed to ensure that the client 110 information in the storage medium(s) 150 is accurate.

For instance, if the phone number is utilized as the identifier and the phone number provided by the user at the client 110 in response to a query is different from the phone number in the storage medium(s) 150, the user may have entered the phone number incorrectly, the original information gathered at the server 130 may have been entered incorrectly, and so on. The information from the storage medium(s) 150 and the client 110 may be compared for any reason. As discussed herein, the server 130 may collect the information associated with the user and/or the client 110 during previous encounters with the client 110 and/or from any other sources.

A registration component 220 may also be included with the provisioning module 140. The registration component 220 can utilize information from the storage medium(s) 150 to "pre-fill" or to otherwise fill in information associated with, a registration for the user associated with the client 110. The server 130 captures information about the user when the client 110 accesses the server 130 initially and/or from any other source, as discussed herein.

For example, when the client 110 logs onto the server 130 to check email, the server 130 may capture the phone number of the client 110, the username of the user associated with the client 110, or any other information associated with the client 110. The information is stored in the storage medium(s) 150 according to a unique identifier assigned by the identification component 210, according to the phone number associated with the client 110, or according to any other method. When the client 110 logs onto the server 130 again in order to request instant messaging services, for example, the registration component 220 accesses the information in the storage medium(s) 150 in order to complete a registration for the user at the client 110 requesting the services.

The registration component 220 can then query the user for any information needed for registration that is not included in the information in the storage medium(s) 150. In one embodiment, information associated with the user and the client 110 is collected by the server 130 from other sources, rather than from a previous encounter the client 110 had with the server 130, as discussed herein. For instance, another service provider may forward information associated with the client 110, the server 130 may access information about the client 110 on available databases utilizing the phone number or other information about the client 110, and so forth. Any manner of gathering information about the client 110 to pre-fill the registration for services is within the scope of various embodiments of the present invention.

The registration component 220 can register the user at the client 110 for any services offered by the service provider associated with the server 130, or otherwise. In one embodiment, the registration component 220 can pre-fill information related to services being requested by the user other than identification information. For instance, the server 130 may store information related to user preferences in the storage medium(s) 150. When the user requests services, the registration component 220 may utilize the user preferences information to pre-fill feature selections associated with the requested services. For example, the registration component 220 may pre-select calendar features for the user according to user preferences captured by the server 130 about user activity related to other services, whether those services are offered by the service provider or not.

The registration component 220 may also be used for generating profiles such as a synchronization profile. Through a synchronization profile, the server 130 may only authenticate itself with those storage mediums 150 that are identified in the profile. For example, if a user has a number of data stores (e.g., storage mediums 150) to access, the profile may indicate that only certain stores are to be accessed based on any variety of factors. Access to particular stores may be temporal (e.g., only access every two hours). Access may be conditional (e.g., only access when a particular event has occurred at the store such as the arrival of new data or a change to existing data or a particular type of new data or change to existing data). Access may also be manual such that a user manually indicates (via client 110) the data stores that are to be accessed during a synchronization operation. Indication may be a manual input or a response to a query (e.g., 'which stores do you wish to access?'). Different profiles amongst a group of profiles may be implemented subject to particular settings by the user at any given time.

A billing component 230 may be included with the provisioning module 140. The billing component 230 can track user activity of the services provided by the service provider. Accordingly, the billing component 230 can determine when to bill the user for the services being provided. The registration component 220 can provide user information to the billing component 230 that may be needed regarding where to bill the user, such as an email address, for instance.

An application generator 240 may be included with the provisioning module 140 for configuring the application and/or services requested by the user for the device 110 associated with the user. The application generator 240 can also create the application for the user including any features the user desires. Any type of application generator 240 may be provided.

In one embodiment, the application generator 240 may utilize provisioning templates to create the profiles for configuring various devices, such as the client 110 (FIG. 1) associated with the user. For instance, the templates may provide the parameters for creating a particular application. The user can also specify customizations to the application, which can be used to modify the template for the application by the application generator 240. In other words, the provisioning templates can provide parameters for configuring various devices for the services as well as customizing the actual service features. The application generation 240 may be utilized in the context of various synchronization profiles, as mentioned above.

A communications interface 250 may also be provided with the provisioning module 140. The communications interface 250 receives communications from the user and/or the server 130 and processes the input utilizing the components discussed herein. Any variety of communications interfaces 250 for a variety of communication mediums and protocols in addition to any number of interfaces may be implemented. As such, a communication interface 250 may be a software application (e.g., a driver) coupled to a hardware device (e.g., Universal Serial Bus (USB), serial, Ethernet, and so forth).

Although the provisioning module 140 is described as including various components, the provisioning module 140 may include more components or fewer components than those listed and still fall within the scope of an embodiment of the invention. For example, the provisioning module 140 may also include business rules for building the applications, a customer service component for managing applications and errors, a protocol configuration component for managing a variety of protocols associated with various devices, and so forth.

Figure 3:
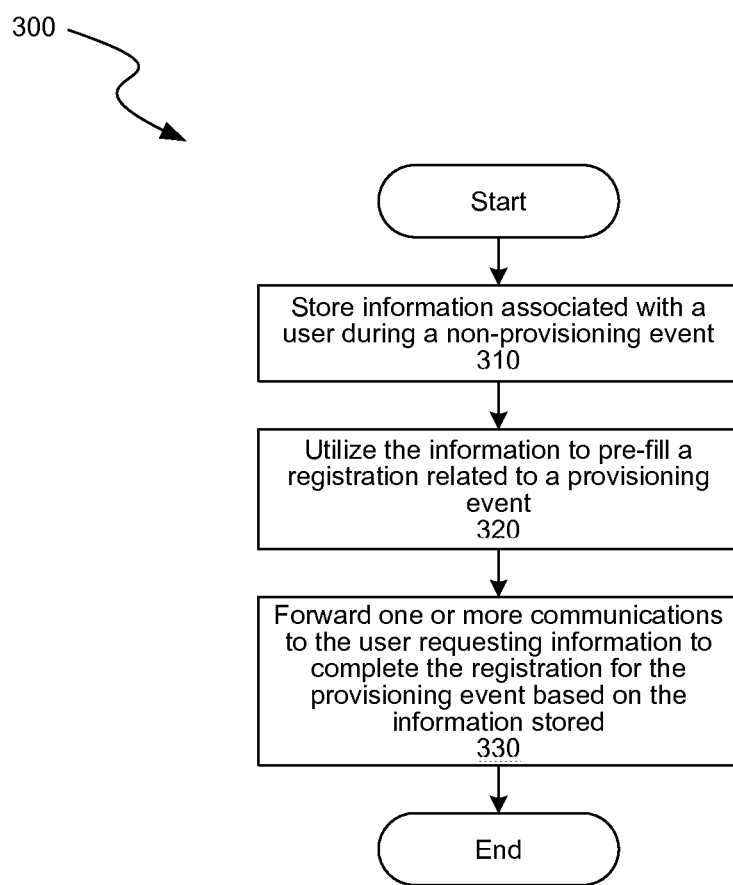
FIG. 3 shows a flow diagram of an exemplary process for providing simplified provisioning in accordance with one embodiment.

FIG. 3 shows a flow diagram of an exemplary process 300 for providing simplified provisioning in accordance with one embodiment. At step 310, information associated with a user during a non-provisioning event is stored. As discussed herein, the information may be stored in the storage medium(s) 150. The server 130 collects information about the user and the client 110 associated with the user when contact is made with the server 130 at a time when provisioning is not occurring. In one embodiment, as discussed herein, the server may collect information related to the user and the client 110 from another source, rather than from the client 110, which also may constitute a non-provisioning event.

In one embodiment, the information related to the user and the client 110 may be collected during one or more previous provisioning events. For instance, the server 130 may store information associated with the user and the client 110 during previous provisioning events in order to avoid or limit querying the user for the same information during future provisioning events.

The information may be stored according to a phone number associated with the device 110 and/or according to a unique identifier assigned to the device 110. For example, the server 130 may assign a unique identifier to the information collected from the device 110 when the device 110 is connected to the server 130. In order to associate the unique identifier to the device 110 for recognition during future contact with the server 130, a text message, for example, can be sent to the device 110 with the unique identifier. The unique identifier may then be sent back to the server 130 to identify the device 110 if the phone number, for example, cannot be accessed by the server 130. As discussed herein, in one embodiment, the server 130 receives information about the user and/or the client 110 from a third party source and stores the information according to the phone number and/or a unique identifier.

At step 320, the information is utilized to pre-fill a registration related to a provisioning event. The information collected by the server 130 from the client 110 during a previous contact with the server 130 and/or from another source (e.g., phone network) is utilized to complete as much of a registration as possible without user input. Accordingly, the user at the client 110 is not required to provide information that the server 130 can access itself.

At step 330, one or more communications are forwarded to the user. The one or more communications are based on the information stored and request information to complete the registration for the provisioning event. In one embodiment, the information requested to complete the registration includes a user query to verify that the information used to complete the registration is correct. The information requested may include a user query to provide a password to complete the registration process, in another embodiment.

By using the information collected by the server 130 during a non-provisioning event that occurred prior to a current provisioning event to complete a registration, or a portion of the registration, the user at the client 110 can provide less information than required if no information about the user was accessible or utilized to pre-fill the registration. Accordingly, the user at the client 110 is provided with simplified provisioning, which may also be applied to future authentication operations such as synchronization of data between the client 110 and storage medium 150.

Figure 4:
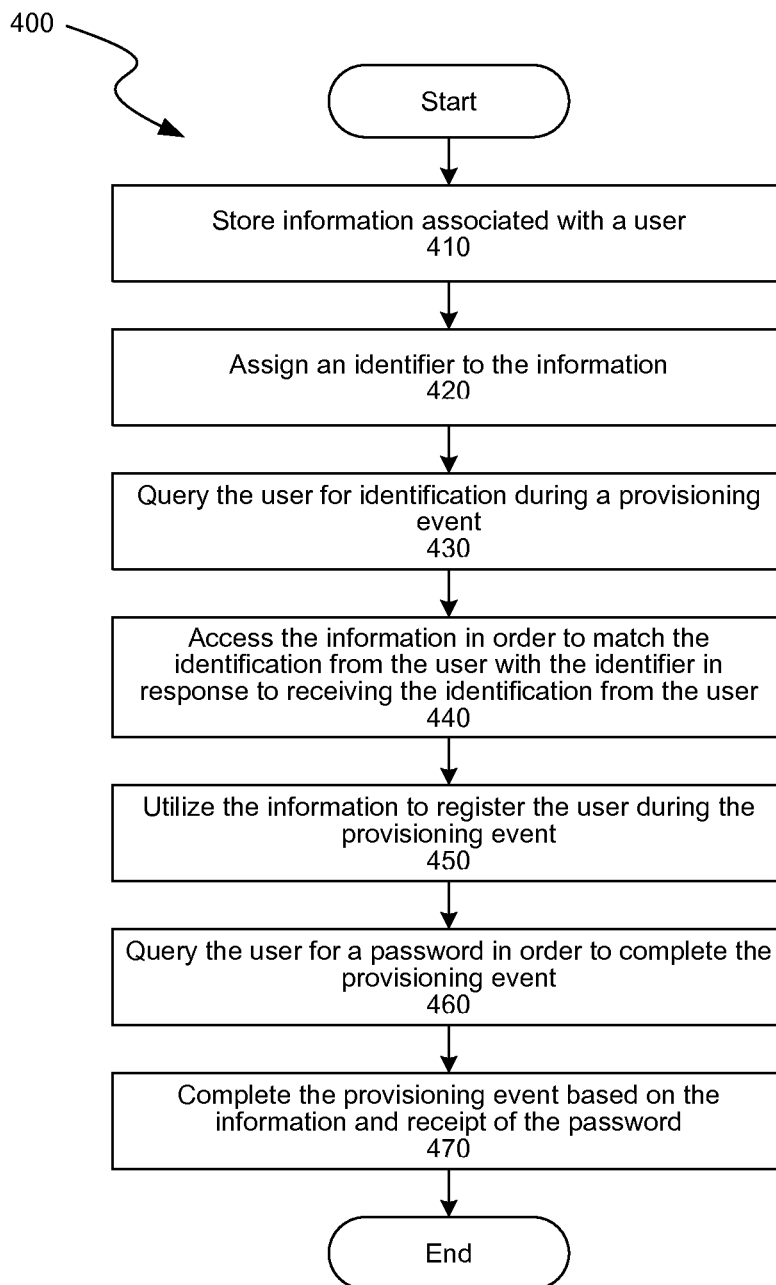
FIG. 4 shows an exemplary process for providing simplified provisioning in accordance with one embodiment.

Turning now to FIG. 4, an exemplary process 400 for providing simplified provisioning in accordance with one embodiment is shown. At step 410, information associated with a user is stored. As discussed herein, the information may be stored by the server 130 and/or to one or more storage mediums, such as the storage medium(s) 150 discussed in FIG. 1.

An identifier is assigned to the information at step 420. The identifier may be assigned to the information in order to locate the information in the storage medium(s) 150, in order to compare the information with other information provided by the user during future contacts with the server 130, and so on. The identifier may be assigned to the information for any reason. As discussed herein, the identifier may be a phone number associated with a device of the user, such as the device 110 discussed in FIG. 1, a unique identifier assigned by the identification component 210 of the provisioning module 140 associated with the server 130, and/or any other type of identifier.

At step 430, the user is queried for identification during a provisioning event (e.g., a subsequent authentication operation as might precede a synchronization operation). The identification sought from the user may be confirmation of the identifier used to store the information at step 420, such as the phone number and/or the unique identifier. The identification sought, however, may be any type of information from the user. For example, a "username" may be sought in order to match the username associated with the user with the username stored in the storage medium(s) 150.

At step 440, the information is accessed in order to match the identification from the user with the identifier associated with the information in response to receiving the identification from the user. The provisioning module 140 accesses the information in the storage medium(s) 150, directly or via the server 130, associated with the user and compares that information with the identification received from the user in response to the query.

By locating the information in the storage medium(s) 150 that was previously collected, the information can be utilized to register the user during the provisioning event at step 450. The information can complete the registration or a portion of the registration associated with the services for which the provisioning event is taking place. By completing the registration or a portion of the registration with information existing about the user and the user device, such as the device 110 discussed in FIG. 1, the user is only required to provide data for the registration not included in the information from the storage medium(s) 150. Thus, the user experiences a streamlined provisioning process that is equally applicable to and inclusive of an authentication operation.

In one embodiment, as discussed herein, the information is utilized to complete the registration and the user is queried to verify that the information utilized is correct. In another embodiment, the user is queried to verify the accuracy of the information utilized according to a length of time between the provisioning event and when the information was collected. For instance, if the information was collected by the server 130 less than one month prior to the provisioning event, the server 130 may not seek verification from the user that the information is still accurate.

At step 460, the user is queried for a password in order to complete the provisioning event. The password may help to ensure that an intended user receives services. For instance, the server 130 may forward the communication regarding services to a user that did not request the services or requested the services using another user's information. Provisioning related information may erroneously reach users for a variety of reasons. The user is queried for the password in order to verify that the user matches the intended user. For instance, if the provisioning information is sent to a "user b" rather than the intended "user a," "user b" will likely not know the "user a" password and resultantly will not be able to receive the services intended to go to the "user a." In some instances (as discussed below), the password may not be required in that the client 110 has otherwise been authenticated as valid by server 130 or some other device tasked with authenticating the client 110.

The provisioning event is completed in response to receiving the password at step 470. The password is compared with a password in the storage medium(s) 150. Provided the password matches the password known for the particular user, the provisioning event may be completed. In one embodiment, the server 130 accesses another database with user password information in order to confirm that the password provided is correct. Any method of verifying the password may be employed.

As discussed herein, the information from the storage medium(s) 150 may be sufficient for completing the registration for the service provider. However, the service provider may require additional information to complete the registration. For instance, the information about the user and/or the client 110 associated with the user the server 130 originally captured may not provide enough information about the user and/or the client 110 required for the registration for the services associated with the provisioning event. Accordingly, more information may be collected from the user. As part of the simplified provisioning process described in FIG. 4, or any other exemplary provisioning process, the user may be queried for additional information to complete the registration.

In one embodiment, the server 130 stores information associated with the user during the client 110 connection with the server sometime prior to the provisioning event. Using the provisioning templates, discussed in FIG. 2 in connection with the application generator 240, the server 130 may collect other information about the user from third party databases in order to complete registration for provisioning for many of the service provider's services based on the provisioning templates. Any type of method for gathering information about the user and/or the device 110 associated with the user for simplifying provisioning is within the scope of various embodiments.

Figure 5:
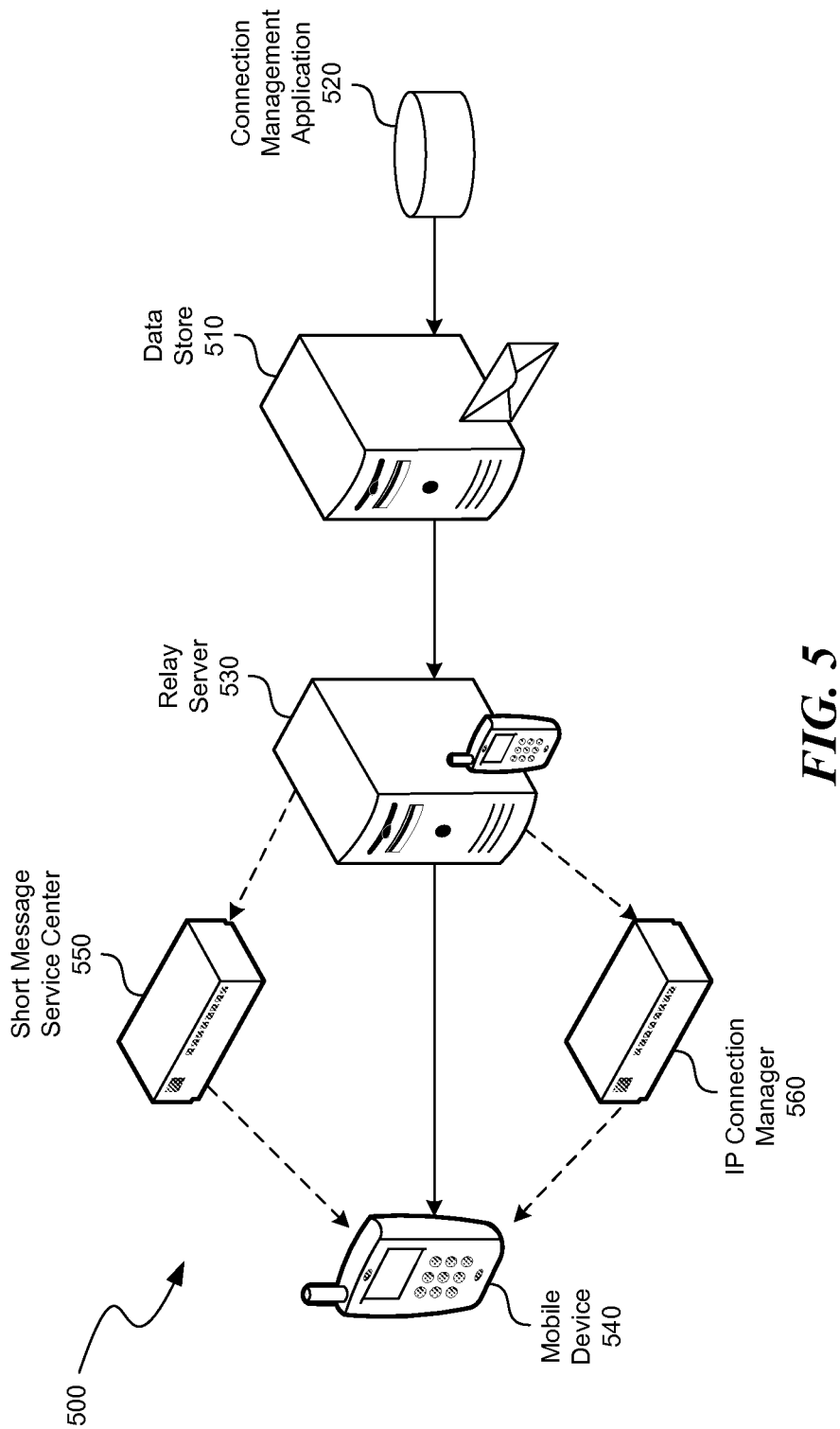
FIG. 5 illustrates an exemplary system for providing delivery of electronic-mail or other data in or substantially in real-time in accordance with an embodiment of the present invention.

FIG. 5 illustrates an exemplary system 500 for providing delivery of electronic-mail or other data in, or substantially in, real-time in accordance with various embodiments of the present invention. Delivery of electronic-mail and/or other data from a data store 510 may occur in, or substantially in, real-time to allow for increased synchronicity between a mobile device 540 and the data store 510. References to real-time or substantially in real-time may generally be construed to mean 'as quickly as possible.' For example, if new data arrives at the data store 510, the present system may undertake certain efforts to synchronize that with a mobile device 540 as quickly as possible.

By further example, some systems may only attempt to synchronize data on a temporal schedule (e.g., every 15 minutes). Such systems are, in fact, out-of-synch between mobile device and data store in that a synchronization operation may take place and then new data arrives immediately following the conclusion of that operation. Thus the device and data store are out-of-synch for as long as 15 minutes (in the present example). By implementing real-time or substantially in-real time data synchronization, upon arrival of new data or a change to existing data at the data store 510, various components of the present system will undertake certain operations to bring the data store 510 into synchronization (at least with respect to desired data) with the mobile device 540 as quickly as possible.

The occurrence of network failures, loss of service, and other nuances of data communication that may delay or even prevent the synchronization of data should not be construed as causing the system to be a non-real-time data delivery system as the system may still undertake efforts to synchronize as quickly as possible. Notwithstanding, the various embodiments of the present invention should not be exclusively limited to a real-time or substantially in real-time delivery system. Such a limitation should be applied solely as governed by the particular limitations (if any) of the particular claim language as set forth below.

Access to the data store 510 may be authenticated via a provisioning module (140) like that described in the context of FIG. 2 and the various methodologies disclosed herein. The provisioning/authentication module may be present at the data store 510, integrated with another application at the data store 510 such as connection application 520 (described below), and/or present at an intermediate computing device such as relay server 530.

Data store 510 may, in some embodiments of the present invention, be a mail server that receives electronic-mail data (e.g., e-mail messages) for a particular enterprise or service provider. Data store 510 may be associated with a particular enterprise such as an office environment but could also be an electronic-mail service provider/service such as Google (gMail). Yahoo! (Yahoo! Mail), or Microsoft (MSN Hotmail). Data store 510 should not be construed as being limited solely to electronic-mail and may include various other data (e.g., calendar, contacts and other PIM data, and documents) as well as other services like those discussed in the context of FIG. 1. While only one data store 510 is illustrated in FIG. 5, the single depicted data store 510 may be representative of one or more data stores 510 implemented in the present invention.

In those embodiments of the present invention wherein data store 510 concerns electronic-mail, the data store 510 (e-mail account) may utilize an IMAP4 or POP3 protocol. IMAP (Internet Message Access Protocol) allows for access of electronic-mail messages that are kept on a mail server via a client e-mail or other proxy application as if the messages were locally stored. For example, electronic mail stored at a data store 510 utilizing IMAP may be manipulated without the need to transfer the messages or files back and forth between remote computing devices. IMAP may be suited for use in a connected and disconnected mail session as messages remain on the mail server until expressly deleted by the user.

The Post Office Protocol (POP), however, may be best suited for a single computing device due to POP support for 'offline' messaging whereby messages are downloaded and then deleted from the mail server. As such, users retrieve messages and then view and manipulate those messages without necessarily being connected to the mail server. POP could be used amongst a plurality of computing devices if, for example, they shared a common file system. Alternatively, a user could (via an electronic mail client or proxy) elect to leave all messages on the server. Notwithstanding, either protocol may be used in various embodiments of the present invention.

Some embodiments of the present invention may further require a software application to be executed at a host computer such as a connection management application 520. This connection management application 520 may be executed in the background of a computing environment without the need for user intervention. For example, on a Windows based-PC, the Windows Services Manager may administer such an application such that the application runs independent of any user control (other than possible administrative tools for configuration). This application 520 may launch automatically with the host computer and may facilitate delivery of electronic mail or other data to a mobile device automatically. The connection management application 520, as a result of an installation operation or through user configuration (for example, through the aforementioned administrative tool), may read the name of a mail server and the IP address of the host computer from the host computer registry whereby the connection application 520 may identify the arrival of new electronic-mail at data store 510 or changes to presently existing data (e.g., a change in a calendar appointment or the creation of a new appointment in a calendar application) and properly inform relay server 530 of the arrival of/change to the same such that a synchronization operation may commence with any requisite authentication operations.

Connection management application 520 may also be used for manipulating data such as task lists, memo lists, the aforementioned calendar data, and contacts. Connection management application 520 may also allow for interaction with data from other devices and/or software platforms. Connection management application 520 may also enable a user to introduce new software application to a mobile device 540 via an over-the-air update operation or through, for example, a synchronization cable. Connection management application 520 may also allow for back-up, filtering, and/or deletion of data.

In some embodiments of the present invention, the aforementioned synchronization operation may be a manual operation that is initiated by a user. The user may enter a command on their mobile device 540 to commence synchronization with the relay server 540 and/or data store 510 and new mail or other data (both new and changed data) is provided to the user's mobile device 540. In such an embodiment, the connection application 520 may not be necessary as the client device 540 and/or relay server 530 accesses the data store 510 utilizing the various provisioning/authentication operations discussed herein without regard for whether new or changed data actually exists at the data store 510. The connection application 520 may be useful, however, with respect to informing a relay server 530 of the actual existence of new and/or change data. The relay server 530 may then inform the user's mobile device 540 of the existence of that data through, for example, an SMS and/or IP exchange as discussed herein. In such an embodiment, the user may still (via manual synchronization) make a decision of when to institute the synchronization operation upon receipt of some indicia of the existence of new and/or changed data.

The relay server 530 may be implemented in any variety of computing devices as are generally known in the art. In some embodiments, the relay server 530 may operate as a central node for delivery of electronic-mail or other data. The relay server 530, too, may control user/device validity (e.g., authentication and provisioning) and may also be used as a point of presence for a web-based interface. In some embodiments, the relay server 530 may be horizontally scalable. Horizontal scalability may be achieved, for example, by introducing new hardware instances to the system. The relay server 530 may also be redundant such that the failure of any single component will not result in system downtime. Redundancy may allow for the introduction of upgrades and additional scaling servers without resulting in system downtime.

In some embodiments, the relay server 530 may be informed by connection management application 520 of the existence of new and/or changed data at the data store 510. The relay server 530, depending upon the particular implementation of the system, may authenticate access to the data store 510 and subsequently forward the data to the mobile device 540 (e.g., through a push operation). In other embodiments, the relay server 530 (upon indication by the connection management application 520 that new and/or altered data is present at data store 510) may provide an instruction to an SMS service center 550 to 'wake up' the mobile device 540 via an SMS message such that a synchronization operation may take place or is at least desirable in light of the new and/or changed data.

In still further embodiments, the relay server 530 may operate in conjunction with an IP connection manager 560 to institute an IP connection for synchronization of data. Through use of the IP connection, synchronization may occur asynchronously and in the background of other mobile device operations. A constantly open IP connection may, however, drain battery resources at the mobile device 540 and/or incur various bandwidth usage charges. As such, and in yet an additional embodiment, an SMS message may cause the device 540 to 'wake up.' which may then allow for the opening of an IP connection via the IP connection manager 560 in a 'hybrid' implementation. In this manner, the IP connection is opened and/or maintained only when new data and/or changed data is present at the data store 510.

The Short Message Service (SMS), as noted above, may be utilized to inform the mobile device 540 of the arrival of new mail (or other new or changed data) at data store 510. SMS allows text messages of up to 160 characters (or 224 in a 5-bit mode) over a Global System for Mobile (GSM) communication network. The text-message characters are sent, received, and may even be generated (for example, with a user interface) via a SMS-gateway, which may be accessed directly as SMS center 550 or via a web-based interface in conjunction with relay server 530.

The SMS-message may be generated as the result of connection management application 520 reflecting the arrival of new and/or changed data at the data store 510, this arrival being communicated to relay server 530, which in turn causes a message to be generated and delivered from the SMS center 550. SMS alerts may be utilized not only for electronic-mail arrivals at the data store 510 but also for generation of new calendar alerts or subject to various filtering mechanisms. For example, filters may be applied to identify messages or other data arriving from specific contacts, messages of a certain priority, and meeting requests scheduled for certain days and/or various hours and/or days of the week. In some embodiments, the SMS trigger may be encrypted. In any case, the receipt of the SMS-message may automatically initiate a synchronization operation wherein various authentication activities as discussed herein may be necessary. The SMS-message, in some embodiments, may simply inform the user of the mobile device 540 that synchronization is desirable in light of the presence of new and/or changed data at the data store 510.

In some embodiments of the present invention. IP-based triggers may be utilized. As noted above, IP-based asynchronous synchronization may allow for background arrival of messages such that the user is not interrupted by such an operation. A further benefit of IP-based triggering is that it may be carrier agnostic. An IP connection manager 560 may be implemented to keep track of active connections and/or for sending IP triggers when appropriate. The relay server 530 may shut down connections or define sync schedules while the client device 540 may have the ability to maintain a connection to the connection manager 560. When an IP trigger is received, the client 540 may connect and perform a synchronization operation with data store 510 via relay server 530.

An incoming e-mail message at data store 510 may activate the notification framework, for example, via connection management application 520. A notification generator at relay server 530 will cause an instruction to be delivered to the SMS center 550 for purpose of generating an SMS message to be forwarded to the mobile client or, alternatively, the notification generator at the relay server 530 may cause the IP Connection Manager 560 to open a connection with the mobile client through an IP trigger. In the SMS+IP trigger hybrid configuration, the SMS message may 'wake up' the device while an IP connection may be used for synchronization. The client 540 and server 530 may then negotiate the signaling mechanism based on client capabilities and available options.

In the IP- and hybrid-trigger configurations, various values may be set by the server and may be updated including a keep alive frequency that may determine how often the client 540 'pings' the connection manager 560, the time to maintain connection, and/or the amount of time the client 540 should maintain the connection when it is idle (e.g., no triggers are received from the server 530. For example, in the hybrid-trigger configuration, the client 540 may maintain an IP connection for 30 minutes and if no email arrives in the time period, the connection may be terminated. When new email does arrive, the server 530 may send an SMS to wake up the client device 540.

In some embodiments of the present invention, connection manager 560, SMS center 550 and relay server 530 may be integrated as part of a single computing device or in the sense that the devices may not be physically remote from one another (e.g., the devices may be independent computing devices but located in a single communications facility). The various devices, however, may also be physically remote depending on the particular configuration of a communications service provider. For example, in one example, the messaging bridge that communicatively couples data store 510 and client device 540 may be hosted by, for example, a cellular service provider.

While real-time or near-real-time delivery of content may be achieved utilizing the various triggering mechanisms, synchronization may also occur periodically (e.g., every n minutes). Synchronization may also be manually initiated through any variety of mechanisms including user-initiated over-the-air or via a physical coupling as may occur through, for example, a synchronization cable.

In addition to authentication authorization to access certain data stores 510, the information used in such authentication operations or stored for the purpose of such authentication operations may be encrypted. Authentication operations may utilize end-to-end 128-bit AES and Diffie-Hellman secret-key negotiations. Further, embodiments of the system may avoid the use of store-and-forward solutions such that data is never stored or written to disk before or after transmission of data (accessed and/or authentication related). Data may be encrypted prior to being transmitted to the mobile device 540. In such an embodiment, when data arrives in the operator network, it is still encrypted and only the mobile device 540 has the unique AES key required to decrypt the data.

In some embodiments, the system may utilize a data-obliteration operation. For example, if a mobile device 540 is lost or stolen, a user may initiate a data-obliterate command via a computing device coupled to the connection management application 520 or the relay server 530 such that all data on the device 540 is removed (such as authentication and provisioning data). The user may also lockdown the device and prevent it from future use. As such, certain embodiments of the present invention may require the installation of client software at a mobile device 540 in order to receive and process certain communications from the host computer application.

Figure 6:
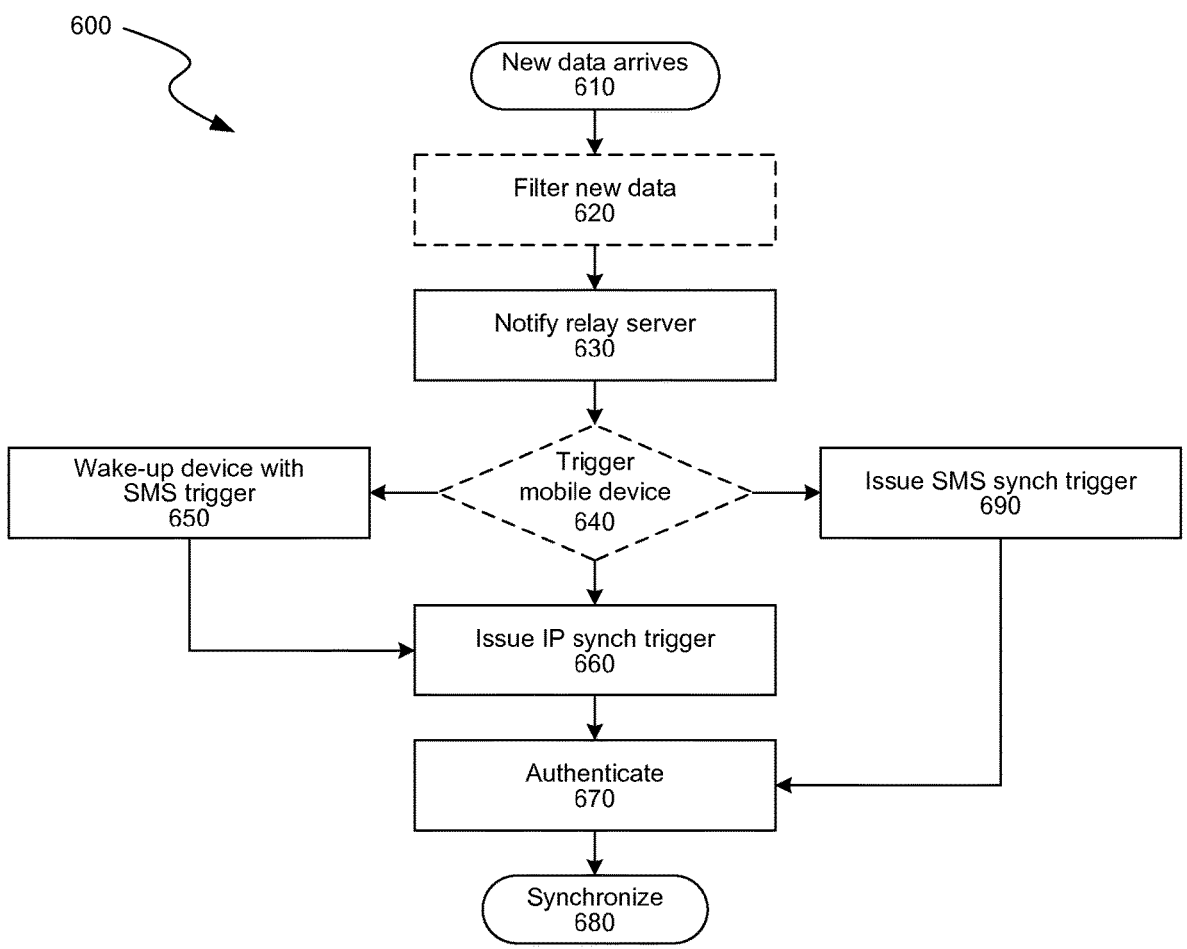
FIG. 6 illustrates an exemplary method for accessing information at a data store in or substantially in real-time in accordance with an embodiment of the present invention.

FIG. 6 illustrates an exemplary method 600 for accessing information at a data store in or substantially in real-time in accordance with an embodiment of the present invention. In step 610, new data arrives at the data store (e.g., data store 510 of FIG. 5). New data may be electronic-mail, calendar data (e.g., meeting invitations, acceptance of meeting invites), electronic documents (e.g., Microsoft Word. Microsoft Excel, Microsoft PowerPoint®, Adobe® PDF, Corel® WordPerfect®, HTML and ASCII), and so forth. Data may also be changed in step 610. For example, the time or place for a meeting may be rescheduled.

In optional step 620, a filter may be applied by, for example, connection application 520. The filter may concern particular senders of an electronic-mail message, message priority, subject of a message (as may be determined from a subject line of textual analysis of the message), address book, contacts, and so forth. The filter may also identify changes to already existing data (e.g., changes to the time or place of a particular meeting).

In step 630, connection application 520 informs the relay server (530) of the arrival of the new data/filtered data. Upon receipt of a notification at the relay server 530 from the connection application 520, a trigger is generated in step 640 for the mobile device such that a synchronization operation should take place in light of the arrival of new, or a change to existing, data.

In one embodiment of the present invention, the synchronization operation may be the result of a hybrid of SMS and IP triggers. As such, the triggering mechanism may initially be an SMS 'wake up' trigger generated at step 650 by SMS center 550. After awakening mobile device 540 via the delivery of an SMS-trigger in step 650, the mobile device 540 may then be in a state to allow for synchronization, the need for which may be indicated via an IP-trigger in step 660, which may be managed via IP connection manager 560. The IP-trigger generated in step 660 may be processed by the mobile device 540 via client-side software installed on the device 540. The synchronization operation may include an authentication operation in step 670 whereby user name, password or other access data is provided to a particular data store (510), namely that store indicating that a synchronization operation is required or that is otherwise reflected by a particular synchronization profile or the manual instructions of the user. The synchronization operation may then commence in step 680.

In another embodiment of the present invention, the relay server 530 (and, in some instances, in conjunction with IP connection manager 560), may issue the IP synchronization trigger in step 660. In such an embodiment, issuance of an SMS wake up trigger (like that described in step 650) may not be necessary if an IP-connection already exists and/or the device 540 is already 'awake' and configured for a synchronization operation. Upon issuance of the IP-trigger in step 660, authentication to data stores may occur in step 670 and a synchronization operation may commence in step 680.

In a still further embodiment of the present invention, the mobile device 540 may be configured in such a way (for example, through client-side software) that an SMS-synchronization trigger is issued by the SMS center 550 in step 690 such that authentication may begin in step 670 followed by synchronization in step 680.

In some embodiments of the present invention, the user may only wish to access information at a particular data store (such as the store indicating the need for synchronization due to the arrival of new or a change to existing data). For example, a user may have multiple electronic-mail accounts but may only be interested with respect to messages being received at a particular account (e.g., a personal account). Rather than have the mobile device 540 and relay server 530 constantly authenticate access to a plurality of data stores 510, which can take time, drain battery power, and consume network bandwidth (and which may result in usage charges depending on a particular network provider), the user may instead seek access and authentication to only a particular data store 510 or series of data stores 510.

The user may designate a particular data store 510 to be accessed prior to initiating an authentication operation or the mobile device 540 may query the user prior to initiating the authentication operation. Access to particular data stores may also be reflected via a synchronization profile. Various user interfaces may be utilized to indicate desired access to particular data stores or profile concerning access to such store may also be created such that authentication operations are carried out with respect to a particular profile.

While various embodiments have been described above, it should be understood that they have been presented by way of example only, and not limitation. For example, any of the elements associated with the provisioning module may employ any of the desired functionality set forth hereinabove. Thus, the breadth and scope of an exemplary embodiment should not be limited by any of the above-described exemplary embodiments. Further, the disclosure of the present application should not be interpreted in any adverse fashion with respect to any parent application from which the present application claims a priority benefit. The present application may expand upon or provide more explicit support for the scope and disclosure of any preceding application. Such expansion or explicit recitation in the present application should not be construed as suggesting that any preceding disclosure lacked support for the same. Further, various methodologies disclosed herein may be included as programs embodied on computer readable mediums for executing the methods disclosed herein.

The invention claimed is:

1. A system for authenticating access to one or more data stores, comprising:
   a communication interface;
   one or more processors communicatively coupled to the communication interface; and
   a memory communicatively coupled to the one or more processors, the memory containing instructions executable by the one or more processors whereby the system is operable to:
   receive, from the one or more data stores, a first notification message of an update in data at one or more data stores, wherein the first notification message comprises an indication of a presence of new data or a change to existing data and does not include all of the information associated with the new or changed data;
   determine whether an Internet Protocol connection exists between the mobile device and the system;
   if an Internet Protocol connection exists, generate a second notification message to the mobile device to inform the mobile device of the update in data at the one or more data stores; and
   if no Internet Protocol connection exists, cause an Internet Protocol connection manager on the mobile device to open an Internet protocol connection to the system to allow synchronization operation,
   wherein the system is communicatively coupled to the one or more data stores.

2. The system of claim 1, wherein the one or more data stores includes at least one email data store wherein the first notification message is received from the one or more email data stores and the first notification message is of an update in email data at the one or more email data stores, wherein the first notification message indicates presence of new email data or a change to existing email data and does not include all of the information associated with the new or changed email data.

3. The system of claim 1, wherein the system is further operable to:
   receive information from the one or more data stores following authentication of the mobile device.

4. The system of claim 3, wherein the system is further operable to:
   forward the information received from the one or more data stores to the mobile device.

5. The system of claim 1, wherein the system is further operable to assign, by an identification module, a client identifier to the mobile device and wherein the mobile device is identified based on the client identifier.

6. The system of claim 5, wherein the client identifier is a token comprising a unique string of data.

7. The system of claim 5, wherein the client identifier is at least one of a telephone number and a user name associated with a user of the mobile device.

8. The system of claim 5, wherein the system queries an Internet Protocol connection manager to determine whether an Internet Protocol connection exists between the mobile device and the system, and wherein the Internet Protocol connection manager delivers a trigger to the mobile device in response to an instruction from the system.

9. The system of claim 1, wherein the synchronization operation occurs in real-time or near real time.

10. The system of claim 1, wherein the first and second notification messages are the same.

11. A method for authenticating access to one or more data stores, comprising:

receiving, by a system communicatively coupled to the one or more data stores, a first notification message from the one or more data stores, where the first notification message is of an update in data at the one or more data stores, wherein the first notification message comprises an indication of a presence of new data or a change to existing data and does not include all of the information associated with the new or changed data;

generating, by the system, a trigger for a mobile device to cause the mobile device to open an Internet Protocol connection with the system; and utilizing, by the system, the opened Internet Protocol connection to the mobile device to facilitate a synchronization operation in the background of other mobile device operations of the mobile device.

12. The method of claim 11, wherein the one or more data stores includes at least one email data store and where the first notification message is of an update in email data at the one or more data stores, wherein the first notification message indicates presence of new email data or a change to existing email data and does not include all of the information associated with the new or changed email data.

13. The method of claim 11, further comprising forwarding information from the one or more data stores to the mobile device, wherein the forwarded information is at least one of electronic mail, personal information management data and documents.

14. The method of claim 13, wherein forwarding information occurs in real-time or near real time.

15. The method of claim 13, wherein the indication of the presence of new data or a change to existing data at the one or more data stores is a result of data at the one or more data stores having been filtered, the indication being received only when the filtered data corresponds to a particular configuration of a filter.

16. The method of claim 11, wherein the trigger is generated for the mobile device upon determining that no Internet Protocol connection exists between the system and the mobile device.

17. The method of claim 11,
wherein the trigger for the mobile device comprises information informing the mobile device of the presence of new data or a change to existing data at the one or more data stores.

18. The method of claim 11, further comprising
authenticating access to specific data stores from the one or more data stores, wherein the specific data stores are those identified by a synchronization profile for the synchronization operation; and
forwarding data from the specific data stores to the mobile device upon establishment of an Internet Protocol connection.

19. The method of claim 11, wherein the first and second notification messages are the same.

20. The method of claim 11, the method further comprising:
receiving information from the one or more data stores following authentication of the mobile device.

21. The method of claim 11, further comprising assigning, by an identification module, a client identifier to the mobile device, wherein the mobile device is identified based on the client identifier.

22. The method of claim 21, wherein the client identifier is a token comprising a unique string of data.

23. The method of claim 21, wherein the client identifier is at least one of a telephone number and a user name associated with a user of the mobile device.

24. The method of claim 11, wherein the synchronization operation occurs in real-time or near real time.

25. The method of claim 24, further comprising
authenticating access to specific data stores from the one or more data stores, wherein the specific data stores are those identified by a synchronization profile for the synchronization operation; and
forwarding data from the specific data stores to the mobile device upon establishment of an Internet Protocol connection.

26. A system for authenticating access to one or more data stores, comprising:
a communication interface;
one or more processors communicatively coupled to the communication interface; and
a memory communicatively coupled to the one or more processors, the memory containing instructions executable by the one or more processors whereby the system is operable to:
receive, from the one or more data stores, a first notification message of an update in data at the one or more data stores, wherein the first notification message comprises an indication of a presence of new data or a change to existing data and does not include all of the information associated with the new or changed data;
generate a trigger for a mobile device to cause the mobile device to open an Internet Protocol connection with the system; and
utilize the opened Internet Protocol connection to the mobile device to facilitate a synchronization operation in the background of other mobile device operations of the mobile device,
wherein the system is communicatively coupled to the one or more data stores.

27. The system of claim 26, wherein the one or more data stores includes at least one email data store wherein the first notification message is received from the one or more email data stores and the first notification message is of an update in email data at the one or more email data stores, wherein the first notification message indicates presence of new email data or a change to existing email data and does not include all of the information associated with the new or changed email data.

28. The system of claim 26, wherein the system is further operable to:
forward information from the one or more data stores to the mobile device, wherein the forwarded information is at least one of electronic mail, personal information management data and documents.

29. The system of claim 28, wherein forwarding information occurs in real-time or near real time.

30. The system of claim 28, wherein the indication of the presence of new data or a change to existing data at the one or more data stores is a result of data at the one or more data stores having been filtered, the indication being received only when the filtered data corresponds to a particular configuration of a filter.

31. The system of claim 26, wherein the trigger for the mobile device is generated upon determining that no Internet Protocol connection exists between the system and the mobile device.

32. The system of claim 26, wherein the trigger for the mobile device comprises information informing the mobile device of the presence of new data or a change to existing data at the one or more data stores.

33. The system of claim 26, wherein the system is further operable to:
   authenticate access to specific data stores from the one or more data stores, wherein the specific data stores are those identified by a synchronization profile for the synchronization operation; and
   forward data from the specific data stores to the mobile device upon establishment of an Internet Protocol connection.

34. The system of claim 26, the system further operable to:
   receiving information from the one or more data stores following authentication of the mobile device.

35. The system of claim 26, wherein the system is further operable to assign, by an identification module, a client identifier to the mobile device and wherein the mobile device is identified based on the client identifier.

36. The system of claim 35, wherein the client identifier is a token comprising a unique string of data.

37. The system of claim 35, wherein the client identifier is at least one of a telephone number and a user name associated with a user of the mobile device.

38. The system of claim 26, wherein the synchronization operation occurs in real-time or near real time.

\* \* \* \* \*